US008640531B2

(12) United States Patent
Remillard et al.

(10) Patent No.: US 8,640,531 B2
(45) Date of Patent: Feb. 4, 2014

(54) TURBINE INSPECTION SYSTEM AND RELATED METHOD OF OPERATION

(75) Inventors: Matthew Michael Remillard, Waterford, NY (US); Edward Lee Bentzel, Acworth, GA (US); Justin Carl Boles, Gloversville, NY (US); Jean-Francois Bureau, St. Jerome (CA); Brent William Shoffner, Port Matilda, PA (US)

(73) Assignee: General Electric Company, Schenectady, NY (US)

( * ) Notice: Subject to any disclaimer, the term of this patent is extended or adjusted under 35 U.S.C. 154(b) by 28 days.

(21) Appl. No.: 13/449,075

(22) Filed: Apr. 17, 2012

(65) Prior Publication Data

US 2013/0269426 A1 Oct. 17, 2013

(51) Int. Cl.
*G01M 15/00* (2006.01)

(52) U.S. Cl.
USPC .......... 73/112.01

(58) Field of Classification Search
USPC .......... 73/112.01
See application file for complete search history.

(56) References Cited

U.S. PATENT DOCUMENTS

| | | | | |
|---|---|---|---|---|
| 5,111,142 | A | 5/1992 | Mazzone et al. | |
| 5,329,230 | A * | 7/1994 | Viertl et al. | 324/262 |
| 5,383,355 | A * | 1/1995 | Baleras et al. | 73/112.01 |
| 5,623,107 | A * | 4/1997 | Patterson et al. | 73/865.8 |
| 5,670,879 | A * | 9/1997 | Zombo et al. | 324/227 |
| 5,969,531 | A * | 10/1999 | Murakami et al. | 324/545 |
| 6,414,480 | B1 * | 7/2002 | Traxler | 324/202 |
| 6,792,809 | B1 * | 9/2004 | Moore | 73/618 |
| 7,190,162 | B2 * | 3/2007 | Tenley et al. | 324/238 |
| 7,337,672 | B2 * | 3/2008 | Blake et al. | 73/600 |
| 7,950,297 | B2 * | 5/2011 | Moore et al. | 73/865.8 |
| 2006/0213274 | A1 * | 9/2006 | Moore et al. | 73/618 |
| 2007/0096728 | A1 * | 5/2007 | Mader Viertl | 324/240 |

* cited by examiner

*Primary Examiner* — Freddie Kirkland, III
(74) *Attorney, Agent, or Firm* — Hoffman Warnick LLC; Ernest G. Cusick

(57) ABSTRACT

Systems and methods for inspecting turbine components are disclosed. In one embodiment, an apparatus includes: a base frame adapted to position an inspection device relative a turbine component; and a set of mounts connected to the base frame, the set of mounts adapted to connect the base frame to at least one other point of the turbine component and to pivotally connect the base frame to a pivot point of the turbine component.

20 Claims, 10 Drawing Sheets

TURBINE INSPECTION SYSTEM AND RELATED METHOD OF OPERATION

BACKGROUND OF THE INVENTION

The subject matter disclosed herein relates to turbines and, more particularly, to systems and methods for inspecting turbine components and features.

Some power plant systems, for example, certain nuclear, simple-cycle and combined-cycle power plant systems, employ turbines in their design and operation. These turbines include a number of components (e.g., rotor discs, spacers, turbine buckets, etc.), which during operation are exposed to a range of physical extremes (e.g., temperature gradients, pressure gradients, etc.). As a result of the stresses these extremes impart, turbine components must be periodically inspected to detect surface and subsurface flaws, check component integrity, and ensure safe turbine operation. Typically, during inspection, the turbine is shut down and various components (e.g., rotor discs) are removed for inspection by an inspection device which may perform ultrasonic tests, eddy current tests, web surfacing, imaging, subsurface scanning, and/or other inspection processes on the components and component features (e.g., bore holes, bolt holes, threads, tabs, etc.). In order to inspect these turbine components and features, the inspection device must be positioned, spaced, and oriented relative to the turbine component. Proper orientation and spacing of the inspection device enables accurate, reliable, and reproducible inspection results. Some systems use a hand held inspection device to perform scanning of turbine components and features. These systems rely on a technician to manually measure, space and align the inspection device for each scan of a feature. However, individually locating the inspection device about each turbine component, as in these systems, may be a difficult and time consuming process. Manually locating and operating the inspection device may generate inconsistent results and lengthen the turbine inspection period, particularly with turbine components which have a number of features requiring inspection (e.g., a rotor disc).

BRIEF DESCRIPTION OF THE INVENTION

Systems and methods for inspecting turbine components are disclosed. In one embodiment, an apparatus includes: a base frame adapted to position an inspection device relative a turbine component; and a set of mounts connected to the base frame, the set of mounts adapted to connect the base frame to at least one other point of the turbine component and to pivotally connect the base frame to a pivot point of the turbine component.

A first aspect of the disclosure provides an apparatus including: a base frame adapted to position an inspection device relative a turbine component; and a set of mounts connected to the base frame, the set of mounts adapted to connect the base frame to at least one other point of the turbine component and to pivotally connect the base frame to a pivot point of the turbine component.

A second aspect provides an inspection system including: a computing device communicatively connected to an inspection device and configured to automate inspection of a turbine component; a base frame adapted to position the inspection device relative the turbine component; and a set of mounts connected to the base frame, the set of mounts adapted to connect the base frame to at least one other point of the turbine component and to pivotally connect the base frame to a pivot point of the turbine component.

A third aspect provides a method device including: connecting a base frame to a turbine component via a center mount, the base frame adapted to position an inspection device relative the turbine component and the center mount pivotally connected to a pivot point on the turbine component; positioning the base frame relative a first feature of the turbine component; securing the base frame relative the first feature via a set of mounts adapted to connect to at least one other point on the turbine component; and performing an automated inspection of the first feature of the turbine component via the inspection device.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
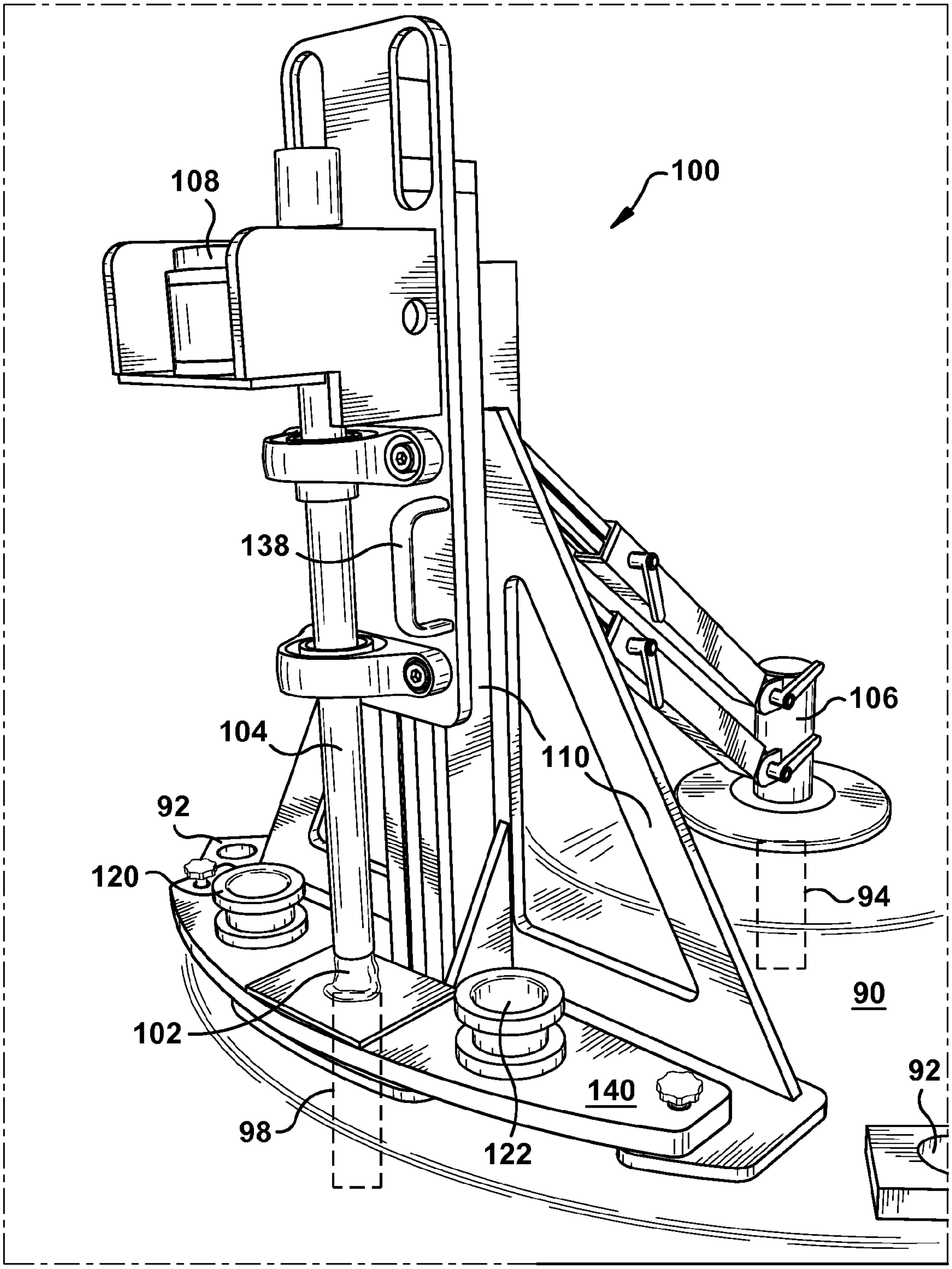
FIG. 1 shows a schematic perspective view of an embodiment of a system in accordance with an aspect of the invention.

It is noted that the drawings of the disclosure may not necessarily be to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated herein, aspects of the invention provide for systems and methods adapted to orient an inspection device relative to a turbine component and perform an automated inspection of the turbine component and features thereon. These systems include a configurable base frame which is adapted to adjustably manipulate and/or orient the inspection device relative to the turbine component, such that the inspection device may detect surface and subsurface flaws in the turbine component.

In contrast to conventional systems described herein, embodiments of the current invention provide configurable systems and methods which affix to a pivot point of a turbine component (e.g., center bore of a rotor disc), and are adjustable to automatically inspect a plurality of features of the turbine component from this affixment point. These systems include a base frame which may pivot (or be rotatable) about the pivot point of the component, adjustably orienting an inspection device about the component relative to the pivot point and/or features of the turbine component. The base frame may include a set of mounts adapted to align the base frame and/or inspection device relative to features of the turbine component, and thereby enable automated inspection of the turbine component and features therein by the inspection device.

Turning to the FIGURES, embodiments of a system adapted to inspect components of a machine such as a turbine component are shown, where the system may decrease turbine down time and increase the efficiency and life expectancy of the turbine, turbine components, and the overall power generation system by quickly and accurately inspecting and identifying surface and/or subsurface flaws in the turbine component. Specifically, referring to FIG. 1, a schematic perspective view of a system 100 in accordance with an aspect of the invention is shown. System 100 may be adapted to inspect a set of bores 92 in a rotor disc 90, and may include a base frame 110 operably connected to rotor disc 90 via a center mount 106, a first mount 120, and a second mount 122. Center mount 106 may be adapted to pivotally connect to a pivot point (e.g., center bore 94 (shown in phantom)) of rotor disc 90, and first and second mounts 120 and 122, may be adapted to connect to a set of other points (e.g., set of bores 92) so as to anchor and/or secure base frame 110 to rotor disc 90 at a position relative to features of rotor disc 90. Base frame 110 may locate and/or orient an inspection device 102 (e.g., probe) relative to set of bores 92 (e.g., at a center of a bore), aligning and/or positioning inspection device 102 for inspection of a bore in set of bores 92. In one embodiment, base frame 110 may vertically align inspection device 110 with rotor disc 90. Inspection device 102 may be manipulated about bore 92 by a control system 108, which may adjust a vertical position of inspection device 102 and/or rotate inspection device 102 via a shaft 104. In one embodiment, first mount 120 and second mount 122 may be located on opposite circumferential sides of an inspection bore hole 98 relative one another. First mount 120 and second mount 122 may connect to set of bores 92 to align inspection device 102 with inspection bore hole 98.

In an embodiment of the present invention, center mount 106 may be adapted to form an interference fit with center bore 94. In one embodiment, base frame 110 may be affixed to center bore 94. In one embodiment, base frame 110 may be periodically pivoted/radially adjusted about center bore 94 by a technician so as to inspect a plurality of bores in set of bores 92. In one embodiment, the technician may remove both first mount 120 and second mount 122 from set of bores 92 and a spacer bracket 140 of base frame 110, thereby enabling radial motion/spin of base frame 110 about center bore 94. Attachment upon rotor disc 90 and inspection/processing by inspection device 102 may be accomplished in any number of ways as is known in the art or discussed further below. It is understood that the use of first mount 120 and second mount 122 are merely illustrative, and that embodiments of the invention may include a single mount or a plurality of mounts.

In one embodiment, base frame 110 may include a set of handles 138 adapted to enable the technician to radially adjust a position of inspection device 102 about rotor disc 90, by rotating base frame 110 about center bore 94. In one embodiment, a position of inspection device 102 about rotor disc 90 may be automatically adjusted by control system 108. In one embodiment, control system 108 may include an axial motor adapted to control operation of inspection device 102 in an axial direction, and a circumferential motor adapted to control operation of inspection device 102 in a circumferential direction. In one embodiment, control system 108 may adjust a vertical position of inspection device 102 via shaft 104. In another embodiment, control system 108 may rotate inspection device 102 relative base frame 110 via shaft 104. Control system 108 may include an inspection system 220 (shown in FIG. 7) which may guide operation of both the circumferential motor and the axial motor in order to manipulate inspection device 102 about the component (e.g., bore hole geometry, scan envelope, etc.). Adjustments of inspection device 102 by control system 108 may include any geometry within the limitations of the mechanical parts, for example, the shaft length and the expansion of inspection device 102, a probe holder/carriage, etc. Inspection device 102 may be connected to shaft 104 and programmed to start and stop inspection and/or scanning at any point within the scan envelop of the bore. Once the scan envelope is programmed into control system 108, an automated scan may be performed. The circumferential speed and/or axial indexing of inspection device 102 are programmable within the limits of motor and motion control hardware and software (e.g., control system 108 and/or inspection system 220). Once a scan by inspection device 102 is initiated, data is automatically acquired by a data acquisition system where it is be analyzed and/or archived. Once the scan is completed, inspection device 102 is removed from the bore, mounts 120 and 122 are removed from the respective bore holes, and base frame 110 may be rotated to align inspection device 102 with the next bore hole to be inspected. Once inspection device 102 is roughly aligned with the next bore hole to be inspected, mounts 120 and 122 are then inserted into a set of bore holes adjacent to the bore hole being inspected to align inspection device 102. Inspection device 102 is then lowered to the bottom or home position of the bore hole, and the automated inspection process is repeated.

In one embodiment, inspection device 102 may include a single element eddy current probe connected to shaft 104 via a spring loaded three leg spindle. In one embodiment, control system 108 may expand the spindle of inspection device 102 upon insertion into inspection bore hole 98 such that the spindle and single element eddy current probe come to a proximity of the diameter of inspection bore hole 98. In one embodiment, the spindle and/or single element eddy current probe may contact the diameter of inspection bore hole 98. In one embodiment, control system 108 may, after expansion of the spindle, rotate inspection device 102 about inspection bore hole 98 via shaft 104. In one embodiment, inspection device 102 may obtain inspection data (e.g., a density of material about the feature, a location of a flaw, etc.) while being rotated. Control system 108 may further periodically vertically index inspection device 102 while rotating so as to achieve a thorough scan of inspection bore hole 98. During this process, inspection device 102 may complete an about 100% scan of the surface of inspection bore hole 98. It is understood that inspection device 102 may include a sensing probe, a borescope, a single element eddy current probe, an ultrasonic probe or any other sensor known.

Figure 2:
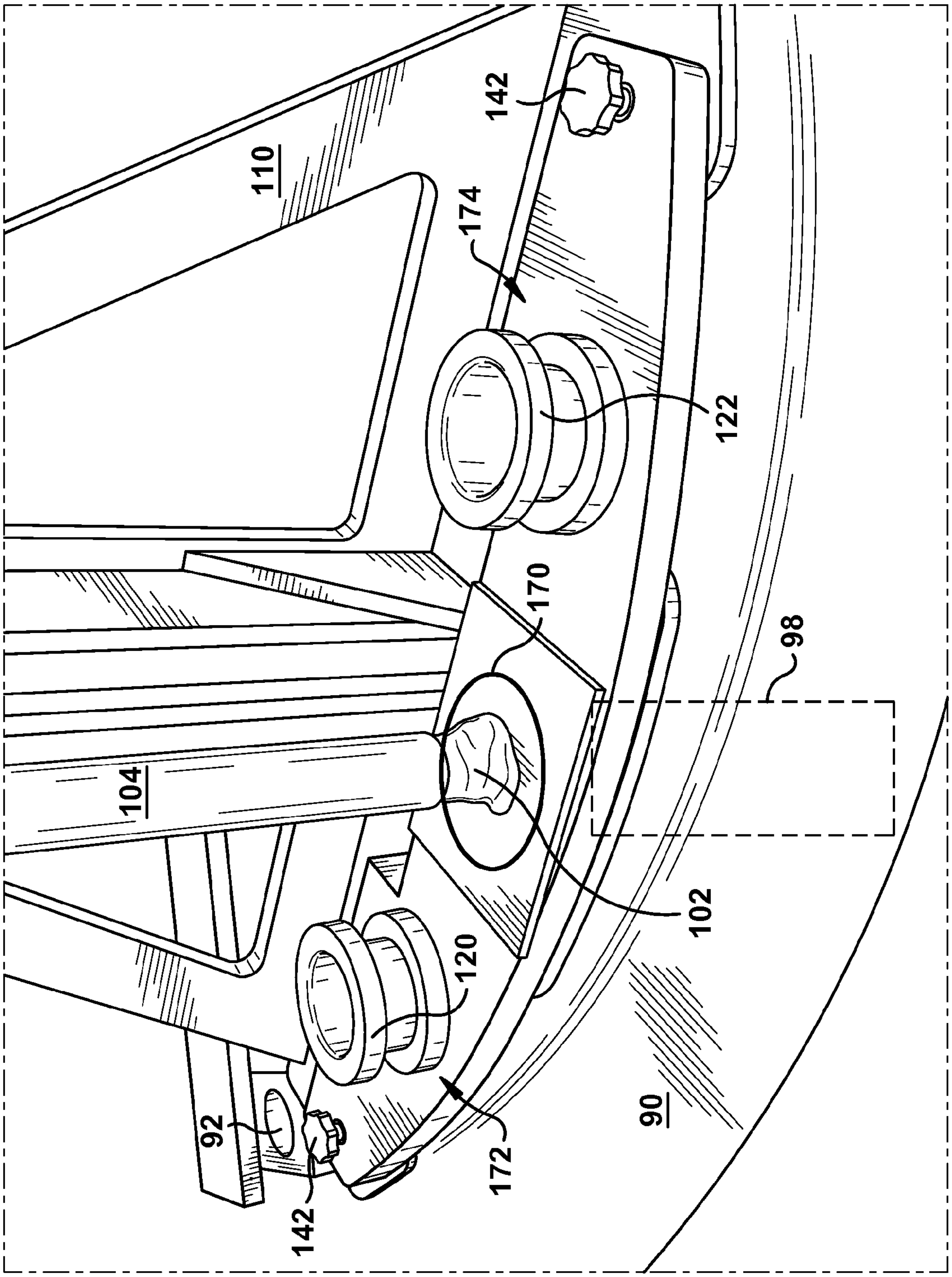
FIG. 2 shows a schematic enlarged perspective view of portions of an embodiment of a system in accordance with an aspect of the invention.

Turning to FIG. 2, a detailed schematic perspective view of first mount 120, second mount 122, and a spacer bracket 140 is shown according to embodiments of the invention. It is understood that in embodiments shown and described with reference to FIGS. 2-10, like numbering may represent like elements and that redundant explanation of these elements has been omitted for clarity. Finally, it is understood that the components of FIGS. 1-10 and their accompanying descriptions may be applied to any embodiment described herein.

Returning to FIG. 2, in this embodiment, spacer bracket 140 includes a set of clamps 142 for attachment to base frame 110. Spacer bracket 140 is attachable and/or removable from base frame 110. In one embodiment, spacer bracket 140 may be adapted for use with a specific turbine and/or turbine component, spacer bracket 140 including a first aperture 172 and a second aperture 174 oriented specifically for the given turbine component. Aperture 172 and 174 may be adapted to properly space inspection device 102 relative the turbine component so as to secure and/or orient base frame 110. A plurality of spacer brackets may be interchanged on base frame 110 in order to properly space and orient mounts 120 and 122, and inspection device 102 relative to the features of a particular turbine design. In one embodiment, spacer bracket 140 may be integral to base frame 110.

In one embodiment, spacer bracket 140 may include a first aperture 172 adapted to accommodate first mount 120, a second aperture 174 adapted to accommodate second mount 122, and a third aperture 170 adapted to access inspection bore hole 98. In one embodiment, apertures 170, 172, and 174, may be adapted to complement/match the spacing of set of bores 92 in rotor disc 90. In one embodiment, a size of apertures 170, 172, and/or 174 may be adjustable. In one embodiment, spacing between apertures 170, 172, and/or 174 may be adjustable.

Figure 3:
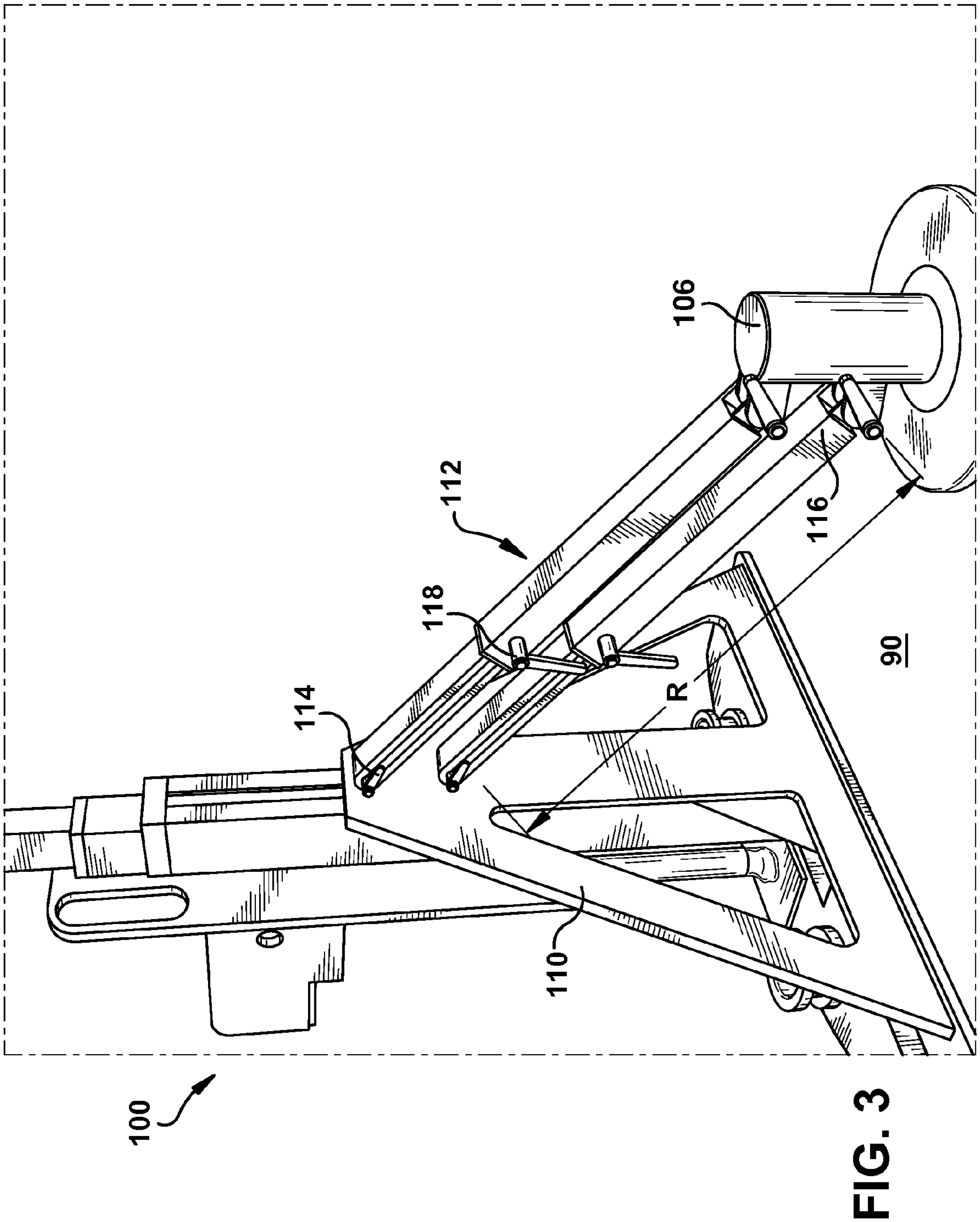
FIG. 3 shows a schematic perspective view of portions of an embodiment of a system in accordance with an aspect of the invention.

Turning to FIG. 3, a schematic perspective view of base frame 110 including an adjustment system 112 (e.g., a parallelogram mount) connected to center mount 106 is shown according to embodiments. In this embodiment, adjustment system 112 includes a set of radial pivots 114 and a set of center pivots 116 connecting base frame 110 to center mount 106. Set of radial pivots 114 and set of center pivots 116 are adapted to adjust a position and/or orientation of base frame 110 relative rotor disc 90 and/or center mount 106. In one embodiment, adjustment system 112 may be adapted to make base frame 110 and center mount 106 configurable to inspect a plurality of turbine component designs, orientations and sizes (e.g., a variety of rotor discs with varied dimensions and designs). In one embodiment, adjustment system 112 may be used to adjust a pitch/angle of base frame 110 relative to rotor disc 90. In one embodiment, adjustment system 112 may include a center slide/joint 118 which may adjust a radial length ‘R’ between base frame 110 and center mount 106. In one embodiment, set of radial pivots 114, set of center pivots 116 and center joint 118 may be adjustable relative one another such that system 100 may be disposed upon any of a number of varied turbine components (e.g., spacers, wheels, rotor discs, etc.). In one embodiment, adjustment system 112 may be manually controlled by a technician. In another embodiment, adjustment system 112 may be controlled by a computing device 210 (shown in FIG. 7).

Figure 4:
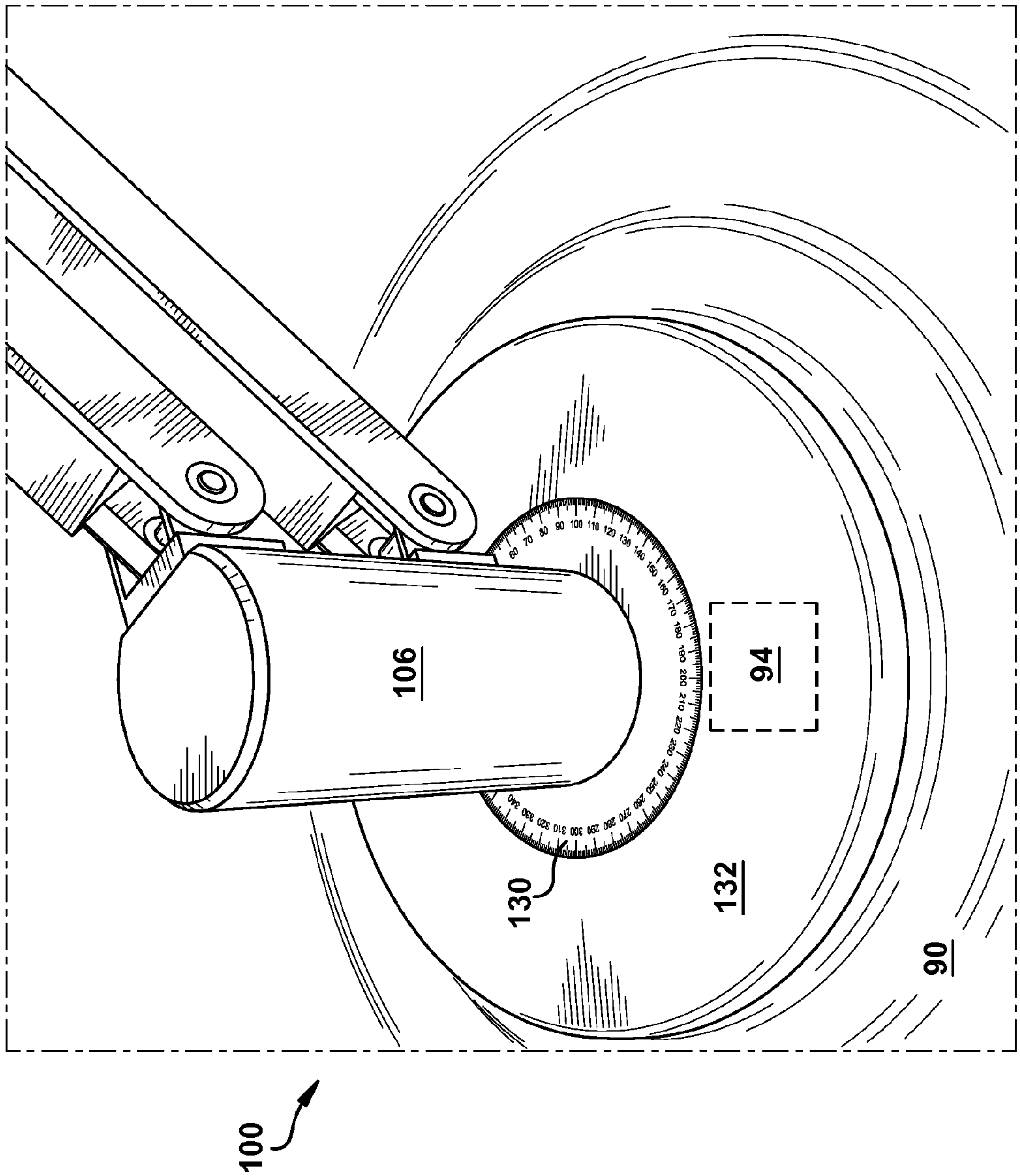
FIG. 4 shows a schematic enlarged perspective view of portions of an embodiment of a system in accordance with an aspect of the invention.

Turning to FIG. 4, a schematic perspective view of center mount 106 is shown according to embodiments of the invention having a directional indicator 130 disposed upon a base member 132. Directional indicator 130 may be configured to indicate an orientation of base frame 110 and/or inspection device 120 relative to center bore 94, center mount 106, and/or rotor disc 90. In one embodiment, directional indicator 130 may include an angular compass adapted to indicate an angular direction of base frame 110 relative to rotor disc 90. In one embodiment, directional indicator 130 may be communicatively connected to computing device 210 which is configured to store inspection data and/or adjustment data obtained from inspection device 102. In one embodiment, computing device 210 may obtain the inspection location of inspection device 102 relative to rotor disc 90 during inspection so as to generate reproducible/verifiable results. In another embodiment, directional indicator 130 may include a digital display for reading/recording by a technician. In one embodiment, directional indicator 130 may include a set of graduated marks and/or an angled protractor for inspection location recordation.

Figure 5:
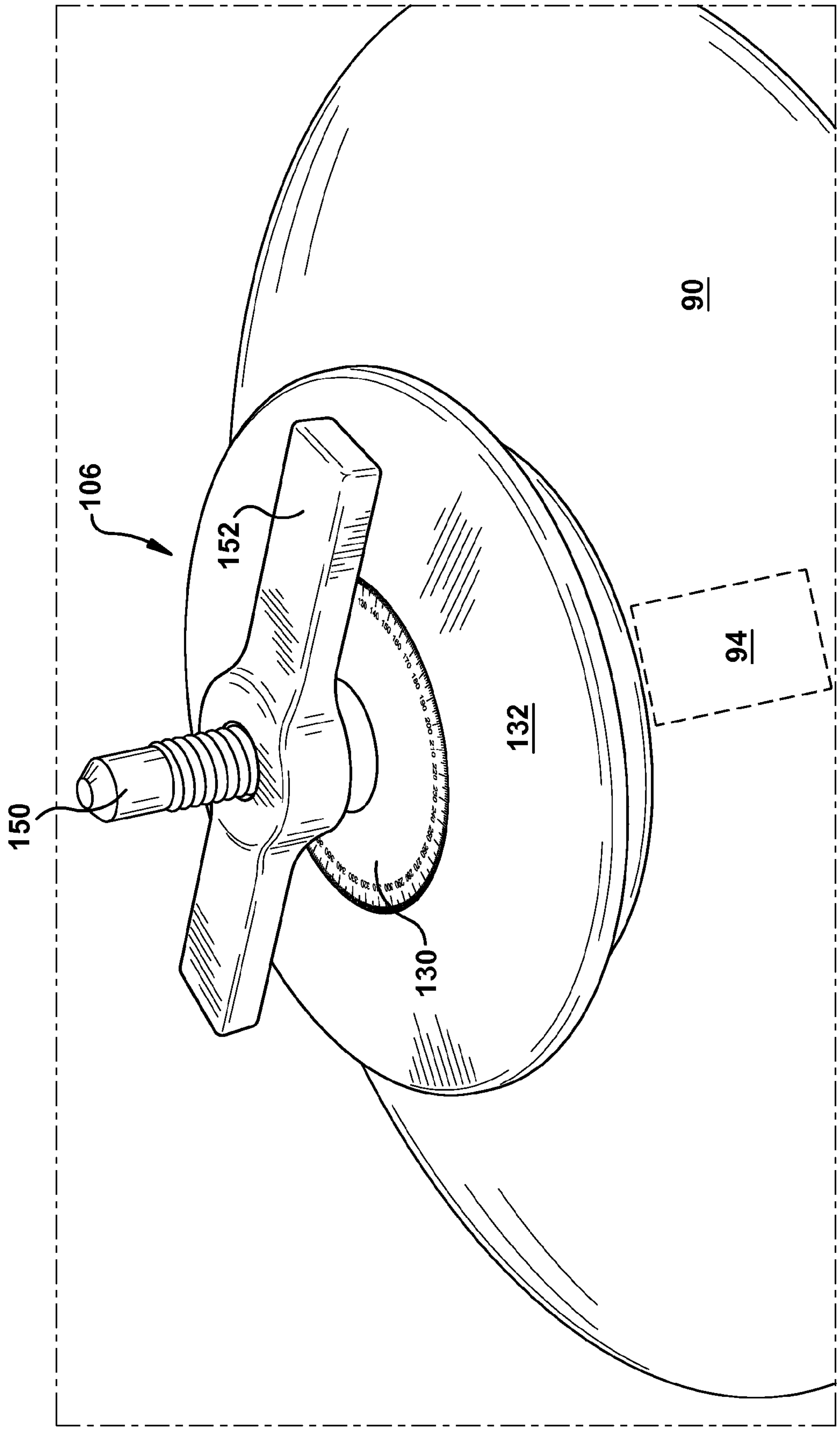
FIG. 5 shows a schematic enlarged perspective view of portions of an embodiment of a system in accordance with an aspect of the invention.

Turning to FIG. 5, a schematic perspective view of center mount 106 is shown including directional indicator 130 according to embodiments of the invention. In this embodiment, base member 132 of center mount 106 includes an attachment member 150 for connection with base frame 110. In one embodiment, attachment member 150 is threaded to complement base frame 110 and enable rotation/pivoting about center bore 94. In one embodiment, attachment member 150 may include a set of bearings adapted to assist rotation of base frame 110 about center mount 106.

Figure 6:
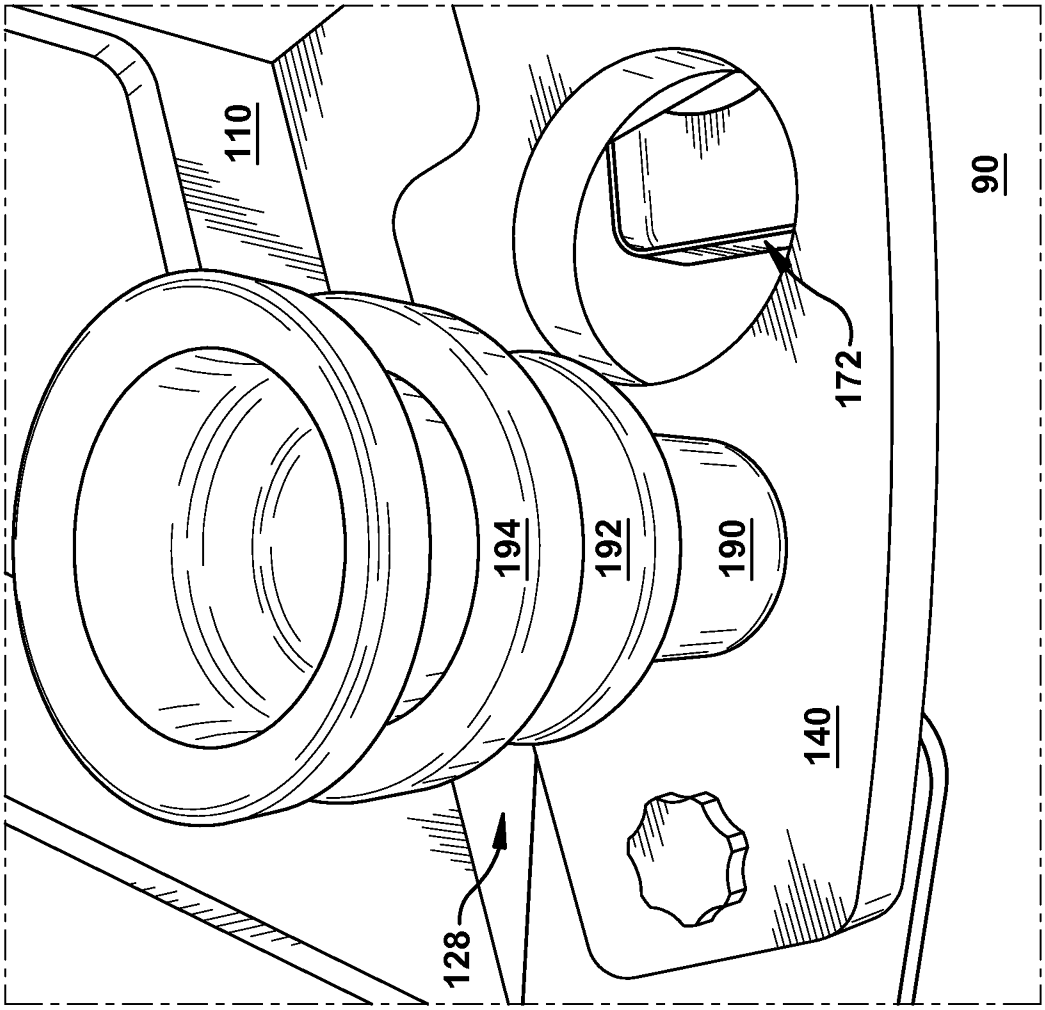
FIG. 6 shows a schematic perspective view of a detail of an embodiment of a system in accordance with an aspect of the invention.

Turning to FIG. 6, a schematic perspective view of an embodiment of a mount 128 is shown according to embodiments of the invention on spacer bracket 140. In this embodiment, mount 128 includes a base portion 190, a collar portion 192, and a neck portion 194. In one embodiment, base portion 190 may be sized to fit within aperture 172 of spacer bracket 140, passing through spacer bracket 140 and into a bore 92 in rotor disc 90, thereby locating base frame 110 about rotor disc 90. In one embodiment, base portion 190 may be adapted to form an interference fit within bore 92. In one embodiment, collar portion 192 may be adapted to form an interference fit with aperture 172 of spacer bracket 140. In one embodiment, collar portion 192 and aperture 172 may be sized larger than bore 92, thereby preventing mount 128 from slipping through spacer bracket 140. In one embodiment, neck portion 194 may be sized larger than aperture 172, such that upon insertion of mount 128 into aperture 172, neck portion 194 is retained on top of spacer bracket 140. It is understood that mounts 120, 122, and 128, may include rubber, plastic, resin, acetal homopolymer, or any other material known.

Figure 7:
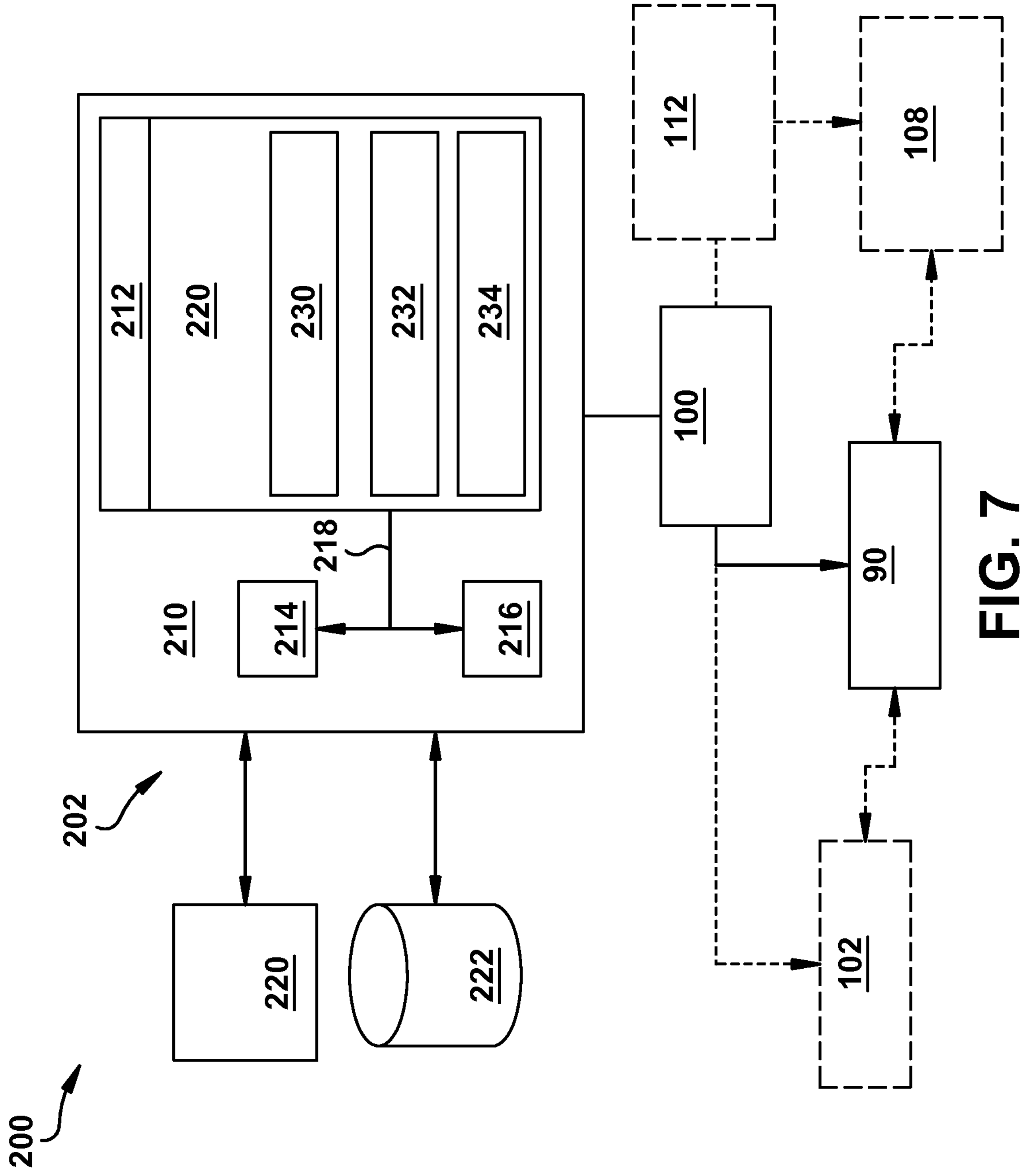
FIG. 7 shows a schematic illustration of an environment including an inspection system in accordance with an embodiment of the invention.

Turning to FIG. 7, an illustrative environment 200 including an inspection system 220 is shown according to embodiments of the invention. Environment 200 includes a computer infrastructure 202 that can perform the various processes described herein. In particular, computer infrastructure 202 is shown including computing device 210 which includes inspection system 220, which enables computing device 210 to inspect turbine components and/or features by performing the process steps of the disclosure.

As previously mentioned and discussed further below, inspection system 220 has the technical effect of enabling computing device 210 to perform, among other things, the automated inspection operations described herein. It is understood that some of the various components shown in FIG. 7 can be implemented independently, combined, and/or stored in memory for one or more separate computing devices that are included in computing device 210. Further, it is understood that some of the components and/or functionality may not be implemented, or additional schemas and/or functionality may be included as part of inspection system 220.

Computing device 210 is shown including a memory 212, a processor unit (PU) 214, an input/output (I/O) interface 216, and a bus 218. Further, computing device 210 is shown in communication with an external I/O device/resource 220 and a storage system 222. As is known in the art, in general, PU 214 executes computer program code, such as inspection system 220, that is stored in memory 212 and/or storage system 222. While executing computer program code, PU 214 can read and/or write data, such as graphical user interface 230 and/or sensor data 234, to/from memory 212, storage system 222, and/or I/O interface 216. Bus 218 provides a communications link between each of the components in computing device 210. I/O device 220 can comprise any device that enables a user to interact with computing device 210 or any device that enables computing device 210 to communicate with one or more other computing devices. Input/output devices (including but not limited to keyboards, displays, pointing devices, etc.) can be coupled to the system either directly or through intervening I/O controllers.

In an embodiment, environment 200 may include a rotor disc 90 communicatively connected to computing device 210 via system 100 which includes base frame 110 (shown in FIG. 1) and/or inspection device 102. Computing device 210 may manipulate a position and/or operation of inspection device 102 and/or base frame 110 via control system 108. In one embodiment, computing device 210 may inspect features of rotor disc 90 via inspection device 102. In one embodiment, computing device 210 and inspection system 220 may obtain inspection data 234 (e.g., eddy current scan results, flaw identification, etc.) for rotor disc 90 from inspection device 102. Computing device 210 and/or inspection system 220 may process inspection data 234 to determine a condition of rotor disc 90 and/or features thereon. In one embodiment, computing device 210 may display inspection data 234, adjustment data 232 (e.g., a position of inspection device 102 relative to rotor disc 90, etc.), and or processing results of inspection data 234 on a graphical user interface 230. In one embodiment, a scan by inspection device 102 may be displayed on graphical user interface 230.

In one embodiment, inspection system 220 may, via control system 108, manipulate inspection device 102 about rotor disc 90 and/or features thereon, locating portions of inspection device 102 about and/or within features of rotor disc 90 so as to facilitate scanning and inspection of the feature and rotor disc 90. In one embodiment, control system 108 may include a set of motors attached to inspection device 102 via shaft 104, the set of motors adapted to rotate and/or vertically position inspection device 102. In one embodiment, control system 108 may include a computer numerical control (CNC) system configured to control movements and location of inspection device 102. In one embodiment, computing device 210 may obtain adjustment data 232 (e.g., a location of inspection device 102 relative base frame 110, a location of inspection device 102 relative rotor disc 90, etc.) from inspection device 102 and/or base frame 110. Computing device 210 may process adjustment data 232 to determine a relative location of inspection device 102 and adjust manipulation of inspection device 102 accordingly.

In one embodiment, computing device 210 and/or inspection system 220 may adjust a position and/or orientation of base frame 110. For example, rotor disc 90 may include a plurality of features disposed about rotor disc 90 at varying radial lengths and angles from center bore 94. To inspect rotor disc 90, base frame 110 may need to be readjusted a plurality of times to properly orient inspection device 102 relative these features for inspection. In one embodiment, computing device 210 and/or inspection system 220 may adjust base frame 110 via adjustment system 112 and/or control system 108. In one embodiment, computing device 210 and/or inspection system 220 may manipulate a set of mounts so as to pivot and/or secure base frame 110 about a pivot point of the turbine component. In one embodiment, computing device 210 may periodically move base frame 110 through a plurality of locations on rotor disc 90 so as to inspect the plurality of features thereon.

In any event, computing device 210 can comprise any general purpose computing article of manufacture capable of executing computer program code installed by a user (e.g., a personal computer, server, handheld device, etc.). However, it is understood that computing device 210 is only representative of various possible equivalent computing devices that may perform the various process steps of the disclosure. To this extent, in other embodiments, computing device 210 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 210 may be/include a distributed control system. In another embodiment, computing device 210 may be integral to base frame 110.

As will be appreciated by one skilled in the art, the control systems and methods described herein may be embodied as a system(s), method(s), operator display (s) or computer program product(s), e.g., as part of a power plant system, a power generation system, a turbine system, etc. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module," "network" or "system." Furthermore, the present invention may take the form of a computer program product embodied in any tangible medium of expression having computer-usable program code embodied in the medium.

Any combination of one or more computer usable or computer readable medium(s) may be utilized. The computer-useable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 8:
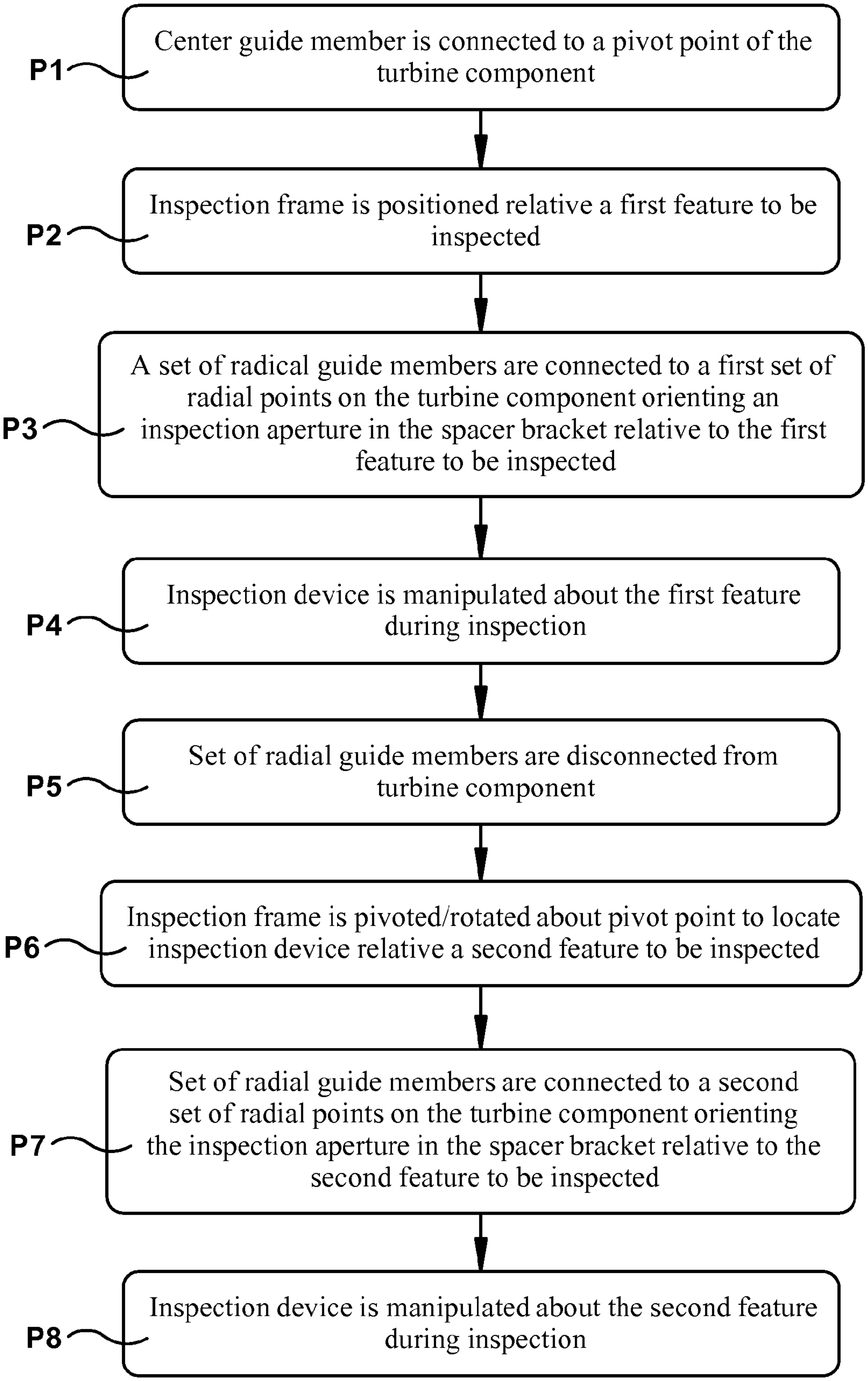
FIG. 8 shows a flow diagram illustrating a process according to embodiments of the invention.

Turning to FIG. 8, an illustrative method flow diagram is shown according to embodiments of the invention: In process P1, system 100 is connected to a turbine component to perform an inspection of the turbine component and/or the component features. That is, either an automatic/scheduled inspection of the turbine component, a condition dictated inspection of the turbine component or a manual/user-commanded inspection of the turbine component. In one embodiment, base frame 110 of system 100 is connected to the turbine component via center mount 106 which is connected to a pivot point of the turbine component (e.g., center bore 94). Following process P1, in process P2, base frame 110 is positioned relative a first feature to be inspected (e.g., inspection bore hole 98). In one embodiment, positioning of base frame 110 may be performed manually by a technician. In another embodiment, positioning of base frame 110 may be performed automatically via computing device 210. In any event, positioning of base frame 210 may include pivoting/rotating of base frame 110 about center bore 94 and/or use of adjust system 112. Following process P2, in process P3, once base frame 110 is positioned relative the first feature to be inspected, a set of mounts are connected to a first set of other points on the turbine component. Connection of the set of mounts to the first set of other points orients base frame 110 and/or inspection device 102 relative to the first feature to be inspected. In one embodiment, connection of the set of mounts orients an inspection aperture in spacer bracket 140 about the first feature to be inspected. In one embodiment, the first feature to be inspected may be a bore hole 98 and the set of mounts may insert into adjacent bore holes 92 in the turbine component to connect and orient base frame 110.

Following process P3, in process P4, inspection device 102 is manipulated about and inspects the first feature, the manipulation including positioning inspection device 102 at one or several locations about the first feature so as to enable inspection of the first feature. In one embodiment, this inspection is automated by control system 108, computing device 210, and/or inspection system 220. In one embodiment, this may include insertion of inspection device 102 into a bore hole 98 or bolt hole. In one embodiment, inspection device 102 may be manually manipulated by a technician. In another embodiment, inspection device 102 may be automatically manipulated by control system 108 and/or computing device 210. In one embodiment, inspection of the first feature may include an eddy current test and/or an ultrasonic test. It is understood that inspection of the first feature may include any form of test known.

Following process P4, in process P5, once inspection of the first feature has been completed by inspection device 102, the set of mounts are disconnected from the turbine component. In one embodiment, disconnection may include removing the set of mounts from base frame 110. In another embodiment, disconnection may include adjusting the set of mounts such that contact with the turbine component is no longer maintained and/or is minimized, but the set of mounts are retained in base frame 110. Following process P5, in process P6, base frame 110 is pivoted/rotated about the pivot point and/or center mount 106 to reposition base frame 110 and locate inspection device 102 relative a second feature to be inspected. In one embodiment, this may include a change in a radial position of base frame 110 relative to the pivot point/center bore 94, this adjustment being performed via adjustment system 112. Following process P6, in process P7, the set of mounts are connected to a second set of other points on the turbine component, orienting inspection aperture and/or inspection device 102 relative the second feature to be inspected. Following process P7, in process P8, inspection device 102 is manipulated about and inspects the second feature, the manipulation including positioning inspection device 102 at one or several locations about the second feature. In one embodiment, this inspection is automated by control system 108, computing device 210, and/or inspection system 220.

The data flow diagram and block diagrams in the FIGURES illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 9:
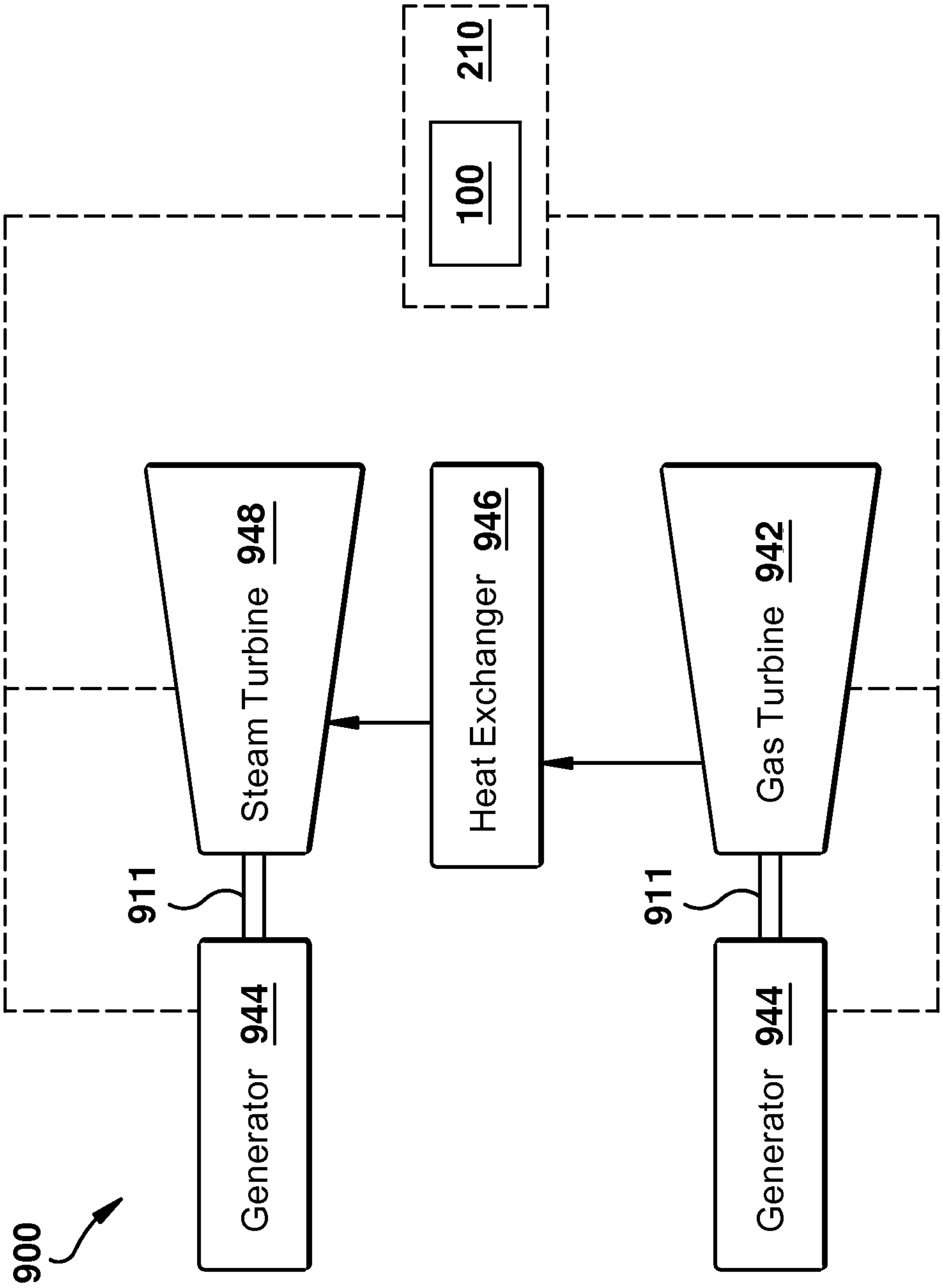
FIG. 9 shows a schematic view of an embodiment of portions of a multi-shaft combined cycle power plant in accordance with an aspect of the invention.
Figure 10:
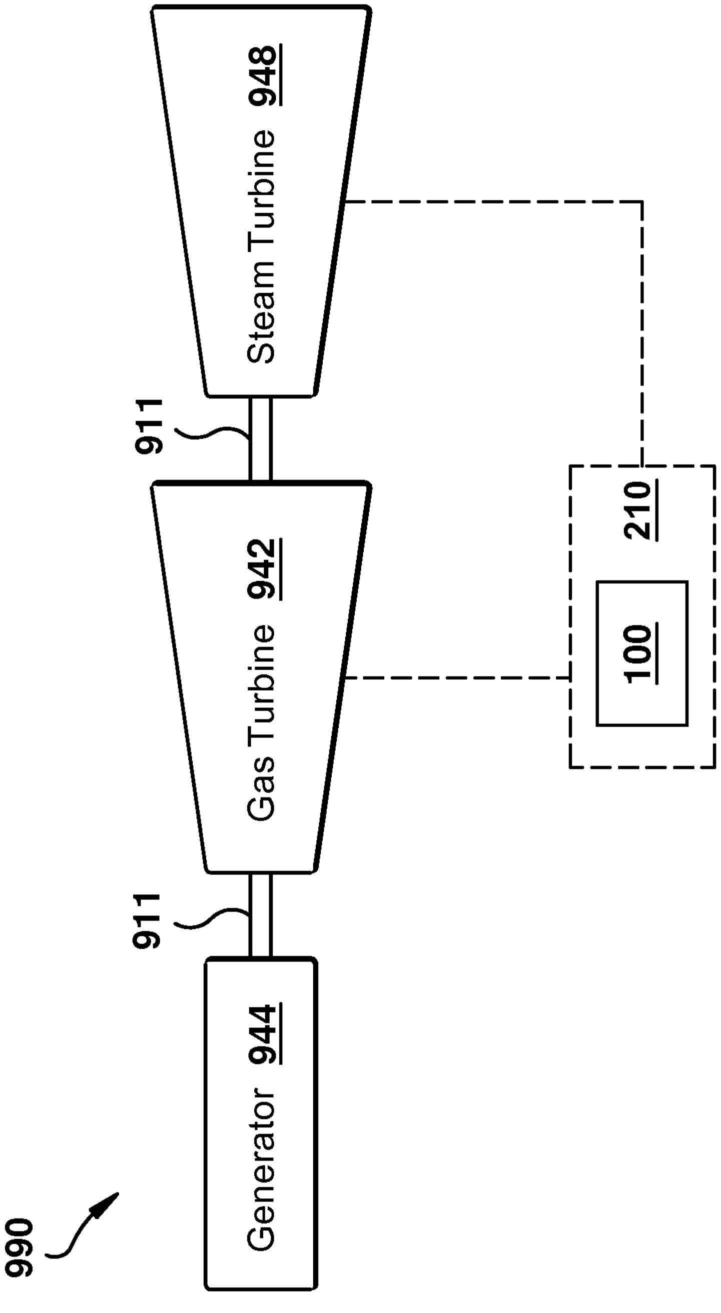
FIG. 10 shows a schematic view of an embodiment of a single shaft combined cycle power plant in accordance with an aspect of the invention.

Turning to FIG. 9, a schematic view of portions of a multi-shaft combined-cycle power plant 900 is shown. Combined-cycle power plant 900 may include, for example, a gas turbine 942 operably connected to a generator 944. Generator 944 and gas turbine 942 may be mechanically coupled by a shaft 911, which may transfer energy between a drive shaft (not shown) of gas turbine 942 and generator 944. Also shown in FIG. 9 is a heat exchanger 946 operably connected to gas turbine 942 and a steam turbine 948. Heat exchanger 946 may be fluidly connected to both gas turbine 942 and steam turbine 948 via conventional conduits (numbering omitted). Heat exchanger 946 may be a conventional heat recovery steam generator (HRSG), such as those used in conventional combined-cycle power systems. As is known in the art of power generation, HRSG 946 may use hot exhaust from gas turbine 942, combined with a water supply, to create steam which is fed to steam turbine 948. Steam turbine 948 may optionally be coupled to a second generator system 944 (via a second shaft 911). It is understood that generators 944 and shafts 911 may be of any size or type known in the art and may differ depending upon their application or the system to which they are connected. Common numbering of the generators and shafts is for clarity and does not necessarily suggest these generators or shafts are identical. Generator system 944 and second shaft 911 may operate substantially similarly to generator system 944 and shaft 911 described above. In one embodiment, portions and/or components of gas turbine 942 and/or steam turbine 948 may be connected to system 100 of FIG. 1 or other embodiments described herein. In one embodiment of the present invention (shown in phantom), system 100 may be used to inspect components and/or features in either or both of steam turbine 948 and gas turbine 942 during an outage. In another embodiment, two systems 100 may be operably connected to combined-cycle power plant 900, one turbine inspection system 100 for each of gas turbine 942 and steam turbine 948. In another embodiment, shown in FIG. 10, a single-shaft combined-cycle power plant 990 may include a single generator 944 coupled to both gas turbine 942 and steam turbine 948 via a single shaft 911. In one embodiment, gas turbine 942 and/or steam turbine 948 may be connected to system 100 of FIG. 1 or other embodiments described herein.

The system of the present disclosure is not limited to any one particular machine, driven machine, turbine, fan, blower, compressor, power generation system or other system, and may be used with other power generation systems and/or systems (e.g., combined-cycle, simple-cycle, nuclear reactor, etc.). Additionally, the system of the present invention may be used with other systems not described herein that may benefit from the early detection, inspection, imaging, recording, adjustment, and measurement capabilities of the system described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus comprising:

a base frame adapted to position an inspection device relative a turbine component; and a set of mounts connected to the base frame, the set of mounts adapted to pivotally connect the base frame to a pivot point of the turbine component and to connect the base frame to at least one other point of the turbine component.

2. The apparatus of claim 1, wherein the set of mounts includes:

a center mount adapted to pivotally connect to the pivot point of the turbine component; and a first mount adapted to connect to a first other point of the turbine component, wherein the set of mounts connected to the base frame is adapted to demountably affix the base frame to the at least one other point of the turbine component.

3. The apparatus of claim 2, wherein the center mount includes a directional indicator configured to indicate an orientation of the base frame relative the turbine component.

4. The apparatus of claim 2, wherein the set of mounts further includes a second mount adapted to connect to a second other point of the turbine component.

5. The apparatus of claim 1, further comprising a spacer bracket connected to the base frame, the spacer bracket adapted to align a first mount with a first other point of the turbine component.

6. The apparatus of claim 1, further comprising a control system connected to the inspection device and adapted to automate inspection of the turbine component by manipulating a position of the inspection device relative the turbine component.

7. The apparatus of claim 6, further comprising a computing device configured to control the control system.

8. The apparatus of claim 1, wherein the base frame includes an adjustment system adapted to control a position of the base frame relative to the pivot point of the turbine component.

9. A system comprising:

a computing device communicatively connected to an inspection device and configured to automate inspection of a turbine component;

a base frame adapted to position the inspection device relative the turbine component; and a set of mounts connected to the base frame, the set of mounts adapted to pivotally connect the base frame to a pivot point of the turbine component and to demountably affix the base frame to at least one other point of the turbine component.

10. The system of claim 9, wherein the set of mounts includes:

a center mount adapted to pivotally connect to the pivot point of the turbine component; and a first mount adapted to connect to a first other point of the turbine component.

11. The system of claim 9, further comprising a control system connected to the inspection device and communicatively connected to the computing device, the control system adapted to manipulate a position of the inspection device relative the turbine component.

12. The system of claim 9, further comprising a spacer bracket connected to the base frame, the spacer bracket adapted to align a first mount with a first other point of the turbine component.

13. The system of claim 9, wherein the base frame includes an adjustment system adapted to control a position of the base frame relative to the pivot point of the turbine component.

14. The system of claim 9, wherein the computing device is configured to process inspection data obtained by the inspection device to analyze the turbine component.

15. A method comprising:

connecting a base frame to a turbine component via a center mount, the base frame adapted to position an inspection device relative the turbine component and the center mount pivotally connected to a pivot point on the turbine component;

positioning the base frame relative a first feature of the turbine component;

securing the base frame relative the first feature via a set of mounts adapted to demountably affix the base frame to at least one other point on the turbine component; and performing an automated inspection of the first feature of the turbine component via the inspection device.

16. The method of claim 15, wherein the positioning includes pivoting the base frame about the pivot point.

17. The method of claim 15, further comprising adjusting a radial position of the base frame via an adjustment system.

18. The method of claim 15, wherein the pivot point is a center bore of the turbine component.

19. The method of claim 15 wherein the performing of the automated inspection includes:

manipulating a position of the inspection device relative the turbine component via a control system connected to a computing device; and scanning the first feature with the inspection device to generate inspection data for the first feature.

20. The method of claim 19, wherein the manipulating a position of the inspection device includes:

inserting the inspection device into the first feature;

expanding a portion of the inspection device to contact a surface of the first feature; and rotating the inspection device within the first feature.

* * * * *

UNITED STATES PATENT AND TRADEMARK OFFICE

CERTIFICATE OF CORRECTION

PATENT NO. : 8,640,531 B2
APPLICATION NO. : 13/449075
DATED : February 4, 2014
INVENTOR(S) : Remillard et al.

It is certified that error appears in the above-identified patent and that said Letters Patent is hereby corrected as shown below:

In the Specification

In Column 5, Lines 61-62, delete “inspection device 120” and insert -- inspection device 102 --, therefor.

In Column 7, Line 30, delete “and or” and insert -- and/or --, therefor.

In Column 9, Line 50, delete “base frame 210” and insert -- base frame 110 --, therefor.

Signed and Sealed this
Thirteenth Day of May, 2014

Michelle K. Lee
*Deputy Director of the United States Patent and Trademark Office*